United States Patent [19]

Noland et al.

[11] 4,273,686

[45] Jun. 16, 1981

[54] EPOXY BASED SYNTHETIC SOLDER

[75] Inventors: James S. Noland, New Canaan, Conn.; Miroslav Hajek, Bel Air, Md.

[73] Assignee: American Cyanamid Company, Stamford, Conn.

[21] Appl. No.: 145,300

[22] Filed: May 1, 1980

Related U.S. Application Data

[63] Continuation-in-part of Ser. No. 70,948, Aug. 30, 1979, abandoned.

[51] Int. Cl.$^3$ .................. C08G 59/46; C08G 50/60
[52] U.S. Cl. ............................ 260/9; 260/37 EP; 525/507; 528/120; 528/367
[58] Field of Search ............ 260/9, 37 EP; 525/507; 528/120, 367

[56] References Cited

U.S. PATENT DOCUMENTS

| 3,386,955 | 6/1968 | Nawakowski et al. | 528/119 X |
| 3,386,956 | 6/1968 | Nawakowski et al. | 528/120 X |

Primary Examiner—Earl A. Nielsen
Attorney, Agent, or Firm—Bruce F. Jacobs

[57] ABSTRACT

Epoxy based synthetic solders are prepared from (a) at least one epoxy resin, (b) at least one filler, (c) 1,1'-o-phenylenebis-(3,3-dimethylurea) wherein the phenyl moiety is optionally substituted with up to two alkyl ($C_{1-3}$) groups and (d) dicyandiamide.

10 Claims, No Drawings

EPOXY BASED SYNTHETIC SOLDER

CROSS REFERENCE TO RELATED APPLICATIONS

This application is a continuation-in-part of U.S. Ser. No. 070,948, filed Aug. 30, 1979, now abandoned.

This invention is directed to a synthetic solder based upon epoxy resins and a specific curing system of a combination of 1,1'-o-phenylenebis(3,3-dimethylurea) wherein the phenyl moiety is optionally substituted with up to two alkyl ($C_{1-3}$) groups and dicyandiamide.

Solders have been known for a long time and lead solder in particular has found wide application in automotive manufacturing. The Environmental Protection Agency has restricted the use of such lead solders after 1980 and therefore there is a need for a suitable product to replace it. Accordingly much research has been conducted to produce a rapidly curing synthetic product which will be satisfactory for use on assembly lines in automotive plants.

U.S. Pat. No. 3,386,955 discloses that various phenylenebis(3,3-dimethylureas) are useful latent epoxy curing agents. Example 5 discloses the use of a mixture of o-, m-, and p-phenylenebis(3,3-dimethylureas) to cure an epoxy resin.

U.S. Pat. No. 3,386,956 discloses that methyl substituted phenylenebisureas may be combined with a cocuring agent selected from dicyandiamide, stearic hydrazide, succinimide and cyanoacetamide to cure epoxy resins.

It has now unexpectedly been discovered that 1,1'-o-phenylenebis(3,3-dimethylurea) wherein the phenyl moiety is optionally substituted with up to two alkyl ($C_{1-3}$) groups when combined with dicyandiamide will produce a curing system for epoxy resins which results in an unexpectedly superior solder in that it provides a very rapid cure (about 3-5 minutes at about 200°-225° C.) for the relatively large masses of filled epoxy solder which will be used on an automotive assembly line, while achieving an essentially smooth, voidfree, sandable surface prior to paint finishing. The m- and p-phenylenebisurea compounds do not produce such a solder. They, as well as other bisurea compounds either do not produce a satisfactory cure to achieve a hard sandable surface, or do cause severe exothermic effects which yield a porous or cracked solder that is not suitable for painting to a glossy finish. Other well known epoxy curing agents are environmentally unstable or undesirable in that toxic products are released during curing.

The polyepoxides used in making the solder have a plurality of reactive 1,2-epoxy groups. They may be polymeric or monomeric (though preferably polymeric), saturated or unsaturated, aliphatic, cycloaliphatic, aromatic or heterocyclic, and they may be substituted if desired with other substituents besides the epoxy groups, e.g. hydroxyl groups, ether radicals, halogen atoms, and the like.

Suitable polyepoxides are such as are disclosed in U.S. Pat. No. 3,386,956, incorporated herein by reference.

Preferred polyepoxides useful herein are those prepared from (1) polyhydric phenols such as 4,4'-dihydroxydihydroxydiphenylmethane, 3,3'-dihydroxydiphenyldiethylmethane, 3,4'-dihydroxydiphenylmethylpropylmethane, 2,3'-dihydroxydiphenylethylphenylmethane, 4,4'-dihydroxydiphenylpropylphenylmethane, 4,4'dihydroxydiphenylbutylphenylmethane, 2,2'-dihydroxydiphenylditolylmethane, 4,4'-dihydroxydiphenyltolylmethylmethane, and the like, and an epihalohydrin such as epichlorohydrin; (2) an epoxy novolac resin obtained by reacting, preferably in the presence of a basic catalyst, an epihalohydrin such as epichlorohydrin with the resinous condensate of an aldehyde, e.g., formaldehyde, and either a monohydric phenol or a polyhydric phenol; and (3) tris(hydroxyphenyl)methane based epoxide resins.

Optionally the polyepoxide may be rubber modified to increase the strength and toughness properties of the solder.

The 1,1'-o-phenylenebis(3,3-dimethylurea) may be prepared by reacting o-phenylene diisocyanate and dimethylamine in the manner of Example 5 of U.S. Pat. No. 3,386,966 incorporated herein by reference, or more preferably by reacting o-phenylenediamine with dimethylcarbamyl chloride in the presence of an HCl acceptor. The substituted phenyl kompounds may be prepared in like manner.

The fillers used herein to reinforce the solder may be any conventional filler which is compatible with the polyepoxide and suitable for use in solders. Examples of these fillers include aluminum powder, calcium carbonate, wood flour, metal oxides like iron oxides, gypsum, asbestos, talc, clays, and other silicates and the like. Asbestos is not preferred due to environmental problems. Optionally the filler may be treated with such as stearic acid to improve the thixotropic properties of the composition. Generally the fillers have particle sizes on the order of 1-30 microns.

Additionally conventional epoxide additives such as thixotropic agents, dyes, pigments, flame retarding agents, as well as other compatible natural and synthetic resins can also be added into the composition.

In the solder compositions of the present invention, the 1,1'-o-phenylenebis(3,3-dimethylurea) compound and the dicyandiamide are used in effective curing amounts. The bisurea is generally used in amounts of about 1 to 10 parts by weight and the dicyandiamide in amounts of about 2 to 20 parts by weight, both per 100 parts by weight of polyepoxide resin. The fillers are generally present in total amounts of about 100 to 300 parts by weight per 100 parts by weight of polyepoxide resin.

Preferably, the solder contains about 1.5 to 4 parts by weight 1,1'-o-phenylenebis(3,3-dimethylurea), about 4 to 10 parts by weight dicyandiamide, and about 150 to 225 parts by weight filler, all per 100 parts by weight of polyepoxide resin.

The following non-limiting examples are presented to illustrate the present invention and its benefits in producing solders which are satisfactory for assembly line applications in automotive plants in that they produce the characteristics described above and, in addition, (1) produce a dense, uniform patch while having a controlled exotherm which precludes foaming or charring of the epoxy resin and (2) pass thermal cycling tests in simulated application studies. All parts and percents are by weight unless otherwise specified.

EXAMPLE I

In a vacuum equipped planetary mixer the following ingredients are blended to achieve an air-free thixotropic mixture:

| Ingredients | Parts |
| --- | --- |
| Epoxy resin[1] | 92.5 |
| Rubber modified epoxy resin[2] | 12.5 |
| 1,1-o-phenylenebis(3,3-dimethylurea) | 2 |
| Dicyandiamide | 5 |
| Aluminum powder | 120 |
| Calcium carbonate treated with stearic acid | 55 |
| Glycerine (thixotrope stabilizing agent) | 1 |

[1]DER 331 of Dow Chemical Co. (reaction product of epichlorohydrin and bisphenol A)
[2]Kelpoxy 293-100 of Wilmington Chemical Co. (rubber modified reaction product of diglycidyl ether of bisphenol A)

Six ounces of the above formulation is applied to the recess of an indented panel of steel for testing. The sample is cured for 3 minutes at 70° C. under an infrared heater. The solder reaches a maximum temperature of 200° C.

After cooling to room temperature the sample is sanded to yield a smooth dense, epoxy patch filling the recess in the desired manner.

EXAMPLE II

A second formulation is prepared as in Example I, with the exception that 2 parts of 1,1'-(2,4-tolylene)-bis(dimethylurea) is used in place of the o-phenylene compound.

When subjected to the same cure cycle the sample smokes and foams. Sanding of the sample produces an unsatisfactory, porous surface.

EXAMPLE III

Lap shear tests in accordance with A.S.T.M. Test D100Z are conducted with each of the formulations of Examples I and II using shimmed, grit blasted, 40 mil thick steel and curing the samples for 5 minutes at 200° C. in a hydraulic press. The samples using the formulation of Example I yield an average lap shear of 3200 psi whereas those of Example II are only 2550 psi and exhibit porous glue lines.

EXAMPLE IV

The procedure of Example 1 is twice repeated with 2 and 4 parts of 1,1'-p-phenylenebis(3,3-dimethylurea) used in place of the o-phenylene compound of the present invention. Upon exposure to the same curing conditions as in Example I, the solders do not cure and remain only partially hardened after cooling.

EXAMPLE V

The following formulation is prepared as in Example I:

| Ingredients | Parts |
| --- | --- |
| Epoxy Novolac resin[1] | 40 |
| Polyurethane modified[2] epoxy resin | 60 |
| 1,1'-o-phenylenebis(3,3-dimethylurea) | 3 |
| Dicyandiamide | 5 |
| Powdered hematite | 120 |
| Calcium carbonate treated with stearic acid | 55 |

[1]DEN 431 of Dow Chemical Company
[2]Epirez 51024 of Celanese Corporation

The composition is applied to a mold and cured for 5 minutes at 200° C. The resultant samples are smooth and uniform. The samples are tested for flexural strength in accordance with A.S.T.M. Test D 790 and found to have a flexural strength to rupture of 11,500 psi at room temperature, and of 10,500 psi at 100° C.

EXAMPLE VI 3,4-diaminotoluene is reacted with excess N,N-dimethylcarbamyl chloride in the presence of slurried calcium carbonate to yield 1,1'-(3,4-toylene)bis(3,3-dimethylurea) which has a melting point of 145°–146° C.

The procedure of Example I is repeating using the tolylene bisurea in place of the phenylenebisurea and the composition cures within 5 minutes to yield a smooth, dense epoxy patch filling the recess in the desired manner.

What is claimed is:

1. An epoxy based synthetic solder comprising at least one epoxy resin having a plurality of 1,2-epoxy groups, at least one filler, and an effective curing amount of 1,1'-o-phenylenebis(3,3-dimethylurea) wherein the phenyl moiety is optionally substituted with up to two alkyl ($C_{1-3}$) groups and dicyandiamide.

2. The solder of claim 1 wherein the phenyl moiety is unsubstituted.

3. The solder of claim 1 wherein the phenyl moiety is substituted with one methyl group meta to either urea moiety.

4. The solder of claim 2 wherein at least one epoxy resin is prepared from a polyhydric phenol and an epihalohydrin.

5. The solder of claim 4 wherein the polyhydric phenol is 4,4'-dihydroxyddiphenyldimethylmethane and the epihalohydrin is epichlorohydrin.

6. The solder of claims 2 or 3 wherein at least one epoxy resin is an epoxy novolac resin.

7. The solder of claims 2 or 3 wherein the fillers are selected from aluminum powder, calcium carbonate, wood flour, gypsum, talc, asbestos, metal oxides and clays.

8. The solder of claims 2, 3, or 5 wherein the 1,1'-o-phenylenebis(3,3-dimethylurea) is present in about 1 to 10 parts by weight, the dicyandiamide is present in about 2 to 20 parts by weight, and the filler is present in about 100 to 300 parts by weight, all per 100 parts by weight of total epoxy resin.

9. The solder of claims 2, 3, or 5 wherein the 1,1'-o-phenylenebis(3,3-dimethylurea) is present in about 1.5 to 4 parts by weight, the dicyandiamide is present in about 4 to 10 parts by weight, and the filler is present in about 150 to 225 parts by weight, all per 100 parts of total epoxy resin.

10. The cured solder of claims 1, 2 or 3.

* * * * *